United States Patent [19]

Danielson et al.

[11] 4,331,769
[45] May 25, 1982

[54] TINTED SPONTANEOUS OPAL GLASS

[75] Inventors: Paul S Danielson; John E. Megles, Jr., both of Corning, N.Y.

[73] Assignee: Corning Glass Works, Corning, N.Y.

[21] Appl. No.: 270,340

[22] Filed: Jun. 4, 1981

[51] Int. Cl.³ .............................................. C03C 3/08
[52] U.S. Cl. ....................................... 501/32; 501/59
[58] Field of Search ..................................... 501/32, 59

[56] References Cited

U.S. PATENT DOCUMENTS

| | | | |
|---|---|---|---|
| 3,649,440 | 3/1972 | Megles | 428/410 |
| 3,661,601 | 5/1972 | Dumbaugh et al. | 501/59 |
| 3,673,049 | 6/1972 | Giffen et al. | 501/59 |
| 3,737,294 | 6/1973 | Dumbaugh et al. | 65/33 |
| 4,235,634 | 11/1980 | Boyd et al. | 501/31 |

Primary Examiner—Mark Bell
Attorney, Agent, or Firm—Clinton S. Janes, Jr.

[57] ABSTRACT

The instant invention is concerned with the production of spontaneous opal glasses exhibiting tints ranging from ivory-through-beige-through-tan-to-brown, depending upon the shade sought, and demonstrating a $Fe^{+3}$ reading between about 6.5–9 consisting essentially, expressed in weight percent on the oxide basis, of about

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| MgO | 1.25 ± 0.3 |
| $B_2O_3$ | 4.5 ± 0.7 |
| F | 3.25 ± 0.5 |
| CaO | 14.5 ± 1.0 |
| NiO | 0.02 − 1.0 |

3 Claims, No Drawings

TINTED SPONTANEOUS OPAL GLASS

BACKGROUND OF THE INVENTION

Spontaneous opal glasses, viz., glasses which opacify upon being cooled from the melt, have been known to the glass art for many years, especially in such consumer applications as tableware. U.S. Pat. No. 3,661,601 provides a concise review of the various mechanisms involved in the development of spontaneous opal glasses and reference is made to that patent for those details.

As is explained in that patent, one type of spontaneous opal is characterized by the separation of a second glassy phase, i.e., not a crystalline phase, which demonstrates a refractive index different from that of the parent or original glass. In essence, this type of opal glass derives its opacity from immiscible droplets dispersed within the parent glass. The patent discloses one group of such glasses consisting essentially, as expressed in weight percent on the oxide basis, of

| | |
|---|---|
| $SiO_2$ | 50–75 |
| $Al_2O_3$ | 3–9 |
| CaO | 11–20 |
| $B_2O_3$ | 1–7 |
| $Na_2O$ | 0–7 |
| $K_2O$ | 0–7 |
| $Na_2O + K_2O$ | 3–10 |
| F | 2–4 |

U.S. Pat. No. 3,673,049 describes the production of laminated glass articles wherein each lamina displays a state of stress which is opposite to the state of stress exhibited by the adjacent layer(s). Phrased in a different manner, the patented articles are composed of laminae demonstrating tensile and compressive stress in alternating relationship with each other. Where a three-ply laminated product is formed comprising a relatively thick interior or core portion enclosed within a thin surface or skin layer manifesting a lower coefficient of thermal expansion than the interior portion, the surface plies will be under compression and the interior portion under tension. This surface compression layer confers significantly enhanced overall mechanical strength to the resultant article.

Three-ply laminates of thin cross section, but displaying high mechanical strength, have been marketed as tableware by Corning Glass Works, Corning, N.Y., under the trademark CORELLE®. Such products consist of a relatively thick core portion composed of a spontaneous opal glass and a transparent skin glass, the skin glass being relatively thin in cross section and possessing a lower coefficient of thermal expansion than the opal interior portion.

U.S. Pat. No. 3,673,049 reports a group of spontaneous opal glass compositions asserted to be particularly useful as interior portions for three-layer laminates. Those glasses are stated to consist essentially, expressed in weight percent on the oxide basis, of

| | |
|---|---|
| $SiO_2$ | 50–75 |
| $Al_2O_3$ | 3–20 |
| Alkali Metal Oxide | 3–20 |
| Alkaline Earth Metal Oxide | 0–20 |
| $B_2O_3 + CeO_2 + Bi_2O_3 + PbO + GeO_2 + CdO + ZnO + Ta_2O_5 + ZrO_2 + TiO_2 + La_2O_3$ | 0–10 |
| $As_2O_3 + Sb_2O_3$ | 0–2 |
| Cl | 0–1.5 |
| $NiO + V_2O_5 + Nd_2O_3 + CuO + CoO + Fe_2O_3 + MnO_2 + Cr_2O_3$ | 0–5 |
| F | 3.8 |

U.S. Pat. No. 3,737,294 is also drawn to laminated glass articles and discloses the same group of spontaneous opal glass compositions as that reported by U.S. Pat. No. 3,673,049 as being especially suitable for use as interior portions for three-ply laminated products.

U.S. Pat. No. 3,649,440 is directed to the thermal tempering of multi-ply laminated glass bodies, wherein adjacent layers are alternately in compression and tension, to substantially increase the impact resistance of the bodies and inhibit spontaneous breakage witnessed as a result of bruise checks arising from mechanical abuse during use. The patent discloses three-layer laminates utilizing a spontaneous opal glass as the interior portion. No glass compositions per se are claimed but operable ranges calculated from the specific exemplary opal glasses tabulated in the patent are set out below, expressed in weight percent on the oxide basis:

| | |
|---|---|
| $SiO_2$ | 64–66.4 |
| $Al_2O_3$ | 6.2–6.3 |
| $B_2O_3$ | 1.3–4.5 |
| MgO | 0.7–0.9 |
| CaO | 13.6–15.7 |
| $Na_2O$ | 2.1–4.4 |
| $K_2O$ | 1.5–4.1 |
| F | 2.7–4.4 |

The use of colorant ions, such as the transition metals (Co, Cr, Cu, Fe, Mn, Ni, Sn, Ti, and V) and the rare earths (Ce, Dy, Er, Eu, Ho, Nd, Pr, Sm, and U), either individually or in various combinations, is well-recognized in the glass art to impart tints to opal and transparent glasses. The color obtained from any individual colorant is influenced, inter alia, by the chemistry and composition of the glass, by the presence of non-oxide anions, e.g., Cl and S, by the thermal history the glass experiences, e.g., thermal tempering, and by the occurrence of an amorphous phase separation or crystallization taking place in the glass.

Furthermore, a spontaneous opal glass commercially practical for use as a core glass in a three-layer glass laminate suitable for tableware must satisfy a matrix of melting, forming, physical, and chemical properties. For example, the glass is required to display the necessary viscosity and liquidus parameters to allow formation of the laminated article via bringing a stream thereof into contact with a stream of the skin glass. The glass must resist devitrification after relatively long term contact with platinum and refractory forming members and melting unit elements. The opacity of the glass should be densely opaque in thin cross section and remain so even if the glass is subjected to subsequent heat treatments such as may be encountered in decorating.

U.S. application Ser. No. 254,901, filed Apr. 16, 1981 in the names of H. J. Holland and J. E. Megles, Jr., discloses spontaneous opal glass compositions suitable for use as core portions in CORELLE® brand tableware. Those glasses consist essentially, as analyzed in weight percent on the oxide basis, of about

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| MgO | 1.25 ± 0.3 |
| $B_2O_3$ | 4.5 ± 0.7 |
| F | 3.25 ± 0.5 |
| CaO | 14.5 ± 1.0 | wherein the preferred MgO content varies between about 1.05±0.05%.

The use of Ni ions as a colorant is not uncommon. The tint resulting can range from yellow-through-brown to purple, depending upon the atomic structure of the host base glass, as well as the thermal history or fictive temperature of the glass. This phenomenon is examined by W. A. Weyl in *Coloured Glasses*, Dawson's of Pall Mall, London, 1959, and in U.S. Pat. No. 4,235,634 where the use of a combination of nickel and manganese ions to color soda lime glasses having compositions within very narrowly defined ranges is described. U.S. Pat. NOs. 3,661,601 and 3,673,049, supra, also disclose the fact that opal glasses can be colored through the addition of nickel ions.

Colored, three-ply laminates can be prepared by incorporating nickel ions in the opal core glass, in the transparent skin glass, or both. It has been found especially advantageous to include a colorant in the core glass since greater homogeneity of appearance is achieved. Moreover, to secure a similar color density by tinting the skin only, much higher levels of a colorant are demanded. As a result, small differences in skin or surface layer thickness can give rise to noticeable inhomogeneities, streaks, etc. in the laminated ware. Consequently, tinting the core only imparts the most homogeneous appearance to the products.

Marketing studies have indicated that only about one-third of the tableware purchased in the United States utilizes products having a white background. The presently available CORELLE ® brand ware involves a white body with a number of decorations applied thereto. Therefore, the primary objective of the instant invention was to provide a spontaneous opal core glass for a three-ply laminate having melting, forming, chemical, and physical properties similar to those exhibited by the core glass of CORELLE ® brand ware, but which would have a tint therein that could range from ivory-through-beige-through-tan-to-brown, depending upon the color sought. Stated more specifically, the most desired goal would be to incorporate a colorant in the composition, expressed in weight percent on the oxide basis, of about

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| MgO | 1.25 ± 0.3 |
| $B_2O_3$ | 4.5 ± 0.7 |
| F | 3.25 ± 0.5 |
| CaO | 14.5 ± 1.0 | in an amount sufficient to confer that tint, but not in such quantity as to significantly alter the fundamental characteristics of the base glass.

SUMMARY OF THE INVENTION

That goal can be achieved despite the discovery that the recited glass compositions manifest an unusual and troublesome faculty for accommodating lower oxidation states of nickel, for example, elemental metallic nickel (Ni°). Hence, where the oxidation state of the glass is low, the resulting coloration falls within a range of unattractive dark gray-to-purple. These reduced nickel species are observed when the glass is in a relatively reduced condition resulting from such occurrences as the presence of organic impurities in the batch. When the oxidation state of the opal glass is adjusted to and maintained within a critically-defined interval, however, desirable coloration is obtained.

The relative oxidation state of the opal glass is difficult to determine chemically, but can be measured by means of a method developed specifically for opal glasses utilizing electron paramagnetic resonance spectroscopy (EPR). In this method the indicator of the oxidation state of the opal glass is the fraction of iron (always existent in impurity amounts in the batch materials) which is present in the oxidized condition, i.e., ferric iron ($Fe^{+3}$). Thus, knowing the total amount of iron present, as analyzed chemically, and the strength of the $Fe^{+3}$ EPR signal, it is possible to determine the relative amount of oxidized iron and, hence, the oxidation state of the opal glass. The EPR spectrometer is utilized in the X-band mode, measuring the peak at $g=4.3$ for ferric iron. A scale has been developed which empirically defines the satisfactory and unsatisfactory operating conditions for the glass. On the scale of 1 to 10, the reading ought not to fall below about 6.5 for desirable color from the nickel ions. A reading of about 9 is the maximum advisable, since highly oxidized glasses are prone to melting and forming defects. On this scale, a reading of 6.5 corresponds to about 30–35% $Fe^{+3}$, i.e., the ratio of $Fe^{+3}$ to total iron, and 9 corresponds to about 45% $Fe^{+3}$.

It is apparent, then, that the oxidation state of the glass must be held within very restricted limits. This circumstance can be accomplished through control of the batch materials employed. For example, the oxidation state of the glass can be increased by substituting alkali metal nitrates for carbonates in the batch.

Attractive shades of ivory, beige, tan, and brown can be produced in the above-recited base glass compositions through the addition of about 0.2–1% NiO thereto, the glass demonstrating a $Fe^{+3}$ EPR reading within the 6.5–9 range. The most preferred tint, viz., a warm beige, is achieved through the addition of about 0.075–0.1% NiO.

DESCRIPTION OF THE PREFERRED EMBODIMENTS

The following table records several glass compositions, expressed in terms of parts by weight on the oxide basis as calculated from the batch, illustrating the parameters of the instant invention. $KNO_3$ was incorporated into the batch to insure the glasses being in the necessary oxidation state to produce a $Fe^{+3}$ EPR reading in the 6.5–9 interval. Because it is not known with which cation(s) the fluoride is combined, it is merely reported as fluoride in accordance with customary glass analysis practice. Inasmuch as the sum of the components totals approximately 100, for all practical purposes the values reported may be deemed to reflect weight percent.

The glasses were prepared by compounding appropriate batch materials, ballmilling the ingredients together to assist in securing a homogeneous melt, placing the mixtures in platinum or silica crucibles, moving the crucibles to furnaces operating at about 1550° C., melting the batches for four hours after last fill, pouring some melts into 6"×6"×½" steel molds and hand pressing other melts into discs having a diameter of about 6", and then immediately transferring the molded and pressed slabs to an annealer operating at 600° C.

The table also recites C.I.E. trichromatic coordinates determined on 4 mm thick polished plates utilizing Illuminant C employing a Hunterlab D25PH Colorimeter in the diffuse reflectance mode.

TABLE

| | 1 | 2 | 3 | 4 | 5 | 6 | 7 | 8 |
|---|---|---|---|---|---|---|---|---|
| $SiO_2$ | 63.4 | 63.4 | 63.4 | 63.4 | 63.4 | 63.4 | 63.4 | 63.4 |
| $Al_2O_3$ | 6.2 | 6.2 | 6.2 | 6.2 | 6.2 | 6.2 | 6.2 | 6.2 |
| $Na_2O$ | 3.05 | 3.05 | 3.05 | 3.05 | 3.05 | 3.05 | 3.05 | 3.05 |
| $K_2O$ | 3.0 | 3.0 | 3.0 | 3.0 | 3.0 | 3.0 | 3.0 | 3.0 |
| MgO | 1.1 | 1.1 | 1.1 | 1.1 | 1.1 | 1.1 | 1.1 | 1.1 |
| CaO | 15.0 | 15.0 | 15.0 | 15.0 | 15.0 | 15.0 | 15.0 | 15.0 |
| $B_2O_3$ | 4.75 | 4.75 | 4.75 | 4.75 | 4.75 | 4.75 | 4.75 | 4.75 |
| F | 3.4 | 3.4 | 3.4 | 3.4 | 3.4 | 3.4 | 3.4 | 3.4 |
| NiO | 0.01 | 0.02 | 0.04 | 0.08 | 0.1 | 0.2 | 0.5 | 1.0 |
| x | 0.3187 | 0.3224 | 0.3261 | 0.3341 | 0.3341 | 0.3395 | 0.3506 | 0.3566 |
| y | 0.3270 | 0.3298 | 0.3331 | 0.3410 | 0.3408 | 0.3433 | 0.3527 | 0.3572 |
| $Y_c$ | 87.3 | 81.3 | 74.3 | 61.0 | 61.6 | 44.2 | 33.9 | 28.2 |

The most preferred composition is that of Example 4 which yields a spontaneous opal with a pleasing, warm beige tint. Additions of NiO in excess of about 1% yield undesirably low $Y_c$ values, and less than about 0.02% NiO has little substantive tinting effect.

Laboratory melts were undertaken aimed at adding a yellow component to the tint produced by the nickel ions by including $CeO_2$ and $TiO_2$ in the batch. In contrast with another glass system (United States application Ser. No. 160,388, filed June 17, 1980 by the present applicants), the nickel-bearing opal base glasses of the instant invention exhibited very little change in color, staying primarily on the same locus of chromaticity data as produced with the nickel additions alone. The cerium-containing glasses demonstrated somewhat higher values of $Y_c$ at any given point (x,y), but the levels of $CeO_2$ and $TiO_2$ necessary to cause an appreciable effect were cost-prohibitive.

We claim:

1. A spontaneous opal glass having a tint ranging from ivory-through-beige-through-tan-to-brown and demonstrating a $Fe^{+3}$ EPR reading between about 6.5–9 consisting essentially, expressed in weight percent on the oxide basis, of about

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| MgO | 1.25 ± 0.3 |
| $B_2O_3$ | 4.5 ± 0.7 |
| F | 3.25 ± 0.5 |
| CaO | 14.5 ± 1.0 |
| NiO | 0.02 – 1.0 |

2. A spontaneous opal glass according to claim 1 wherein said NiO ranges between about 0.075–0.1%.

3. A spontaneous opal glass according to claim 1 exhibiting the following chromaticity data:

| | |
|---|---|
| x | 0.3187–0.3566 |
| y | 0.3270–0.3572 |
| $Y_c$ | 87.3–28.2 |

* * * * *